United States Patent
Ou et al.

(10) Patent No.: US 10,747,434 B2
(45) Date of Patent: Aug. 18, 2020

(54) LIGHT-EMITTING STORAGE DEVICE AND LIGHT-EMITTING CONTROL METHOD

(71) Applicant: ESSENCORE Limited, WanChai (HK)

(72) Inventors: Ming-Chang Ou, Taoyuan (TW); Seok-Cheon Kwon, Yongin (KR); Chan-Ho Sohn, Taipei (TW)

(73) Assignee: Essencore Limited, Hong Kong (CN)

( * ) Notice: Subject to any disclaimer, the term of this patent is extended or adjusted under 35 U.S.C. 154(b) by 0 days.

(21) Appl. No.: 16/249,345

(22) Filed: Jan. 16, 2019

(65) Prior Publication Data

US 2019/0361604 A1    Nov. 28, 2019

Related U.S. Application Data

(60) Provisional application No. 62/676,634, filed on May 25, 2018.

(51) Int. Cl.
*G06F 3/06* (2006.01)
*H05B 45/20* (2020.01)

(52) U.S. Cl.
CPC .......... *G06F 3/0604* (2013.01); *G06F 3/0655* (2013.01); *G06F 3/0673* (2013.01); *H05B 45/20* (2020.01)

(58) Field of Classification Search
CPC .... G06F 3/0604; G06F 3/0655; G06F 3/0673; H05B 33/0857
See application file for complete search history.

(56) References Cited

U.S. PATENT DOCUMENTS

| | | | | |
|---|---|---|---|---|
| 2005/0111231 A1* | 5/2005 | Crodian | ................. | B60Q 3/16 362/545 |
| 2015/0342011 A1* | 11/2015 | Brochu | ................. | H05B 33/08 315/294 |
| 2019/0087348 A1* | 3/2019 | Liao | ................. | G06F 12/1009 |

* cited by examiner

*Primary Examiner* — Renan Luque
*Assistant Examiner* — Jianzi Chen
(74) *Attorney, Agent, or Firm* — Muncy, Geissler, Olds & Lowe, P.C.

(57) ABSTRACT

A light-emitting storage device and a light-emitting control method are provided. The device includes a storage device controller, a processor, and at least one light-emitting unit. The storage device controller is electrically connected to a host through a host controller interface for controlling the access of the light-emitting storage device. The processor is electrically connected to the storage device controller to connect to the host. The at least one light-emitting unit is electrically connected to the processor. When the host transmits a control signal to the storage device controller through the host controller interface and the control signal is judged as a signal for controlling the at least one light-emitting unit by the storage device controller, the storage device controller transmits the control signal to the processor to control a light-emitting mode of the at least one light-emitting unit.

16 Claims, 4 Drawing Sheets

LIGHT-EMITTING STORAGE DEVICE AND LIGHT-EMITTING CONTROL METHOD

CROSS-REFERENCES TO RELATED APPLICATIONS

This application claims priority to and the benefit of, pursuant to 35 U.S.C. § 119, U.S. provisional patent application Ser. No. 62/676,634 filed on May 25, 2018, the disclosure of which is incorporated herein in its entirety by reference.

FIELD OF THE INVENTION

The present disclosure relates to a light-emitting storage device and light-emitting control method, particularly to a light-emitting storage device and light-emitting control method applied to the gaming market.

BACKGROUND OF THE INVENTION

The gaming market has rapidly been growing in recent years. Demands of sound and light effects of computers and computer peripherals that gaming players ask for have become greater and greater. Particularly, the increase of demands in "light" effects such as disposing LEDs on a DRAM (Dynamic Random Access Memory) module or a graphic card results in the sequential appearance of related products in recent years. However, the control of LEDs in most of these products remains operation of on/off switching.

Although more and more computer peripherals, on which LEDs' functions such as flash and color are capable of being controlled, have recently been produced, it is necessary to configure additional control interfaces (bus bars) to transmit the light-emitting control signals, leading to additional costs.

SUMMARY OF THE INVENTION

In view of the above-mentioned problems, the present disclosure provides a device and a method able to make use of elements and control interfaces inherently built in a computer to achieve controlling the switching, colors, flashing effect, and so on of light-emitting elements (such as LED) without the need of additional elements and control interfaces.

In accordance with one purpose of the present disclosure, a light-emitting storage device is provided, which including: a storage device controller, electrically connected to a host through a host controller interface, and the storage device controller controlling the light-emitting storage device to perform reading and writing; a processor, electrically connected to the storage device controller to be electrically connected to the host through the storage device controller; and at least one light-emitting unit, disposed on the light-emitting storage device and electrically connected to the processor. Wherein, when the host transmits a control signal to the storage device controller through the host controller interface, and the control signal is judged as a signal for controlling the at least one light-emitting unit by the storage device controller, the storage device controller further transmits the control signal to the processor to control a light-emitting mode of the at least one light-emitting unit.

In accordance with another purpose of the present disclosure, a light-emitting storage device is provided, which including: a storage device controller, electrically connected to a host through a host controller interface, and the storage device controller controlling the light-emitting storage device to perform reading and writing; a processor, electrically connected to the host through the host controller interface; and at least one light-emitting unit, disposed on the light-emitting storage device and electrically connected to the processor. Wherein, when the host transmits a control signal to the storage device controller and the processor through the host controller interface, and the control signal is judged as a signal for controlling the at least one light-emitting unit by the processor, the processor controls a light-emitting mode of the at least one light-emitting unit according to the control signal.

Preferably, the processor may have a processor firmware. A light-emitting command format is defined in the processor firmware. The light-emitting command format has a control parameter to control the light-emitting mode of the at least one light-emitting unit.

Preferably, the storage device controller may have a controller firmware. A control command format is defined in the controller firmware. The control command format includes at least a part of the control parameter of the light-emitting command format.

Preferably, the control parameter may correspondingly control a light-emitting color, a light-emitting pattern, a light-emitting brightness, a light-emitting frequency, and a light-emitting waveform of the at least one light-emitting unit.

In accordance with another purpose of the present disclosure, a light-emitting control method is provided, which is applicable to a light-emitting storage device. The light-emitting storage device includes a storage device controller, a processor, and at least one light-emitting unit. The light-emitting control method includes: electrically connecting the storage device controller to a host through a host controller interface in such a way that the storage device controller controls the light-emitting storage device for read/write access by the host; electrically connecting the processor to the storage device controller in such a way that the processor is electrically connected to the host through the storage device controller; and disposing the at least one light-emitting unit on the light-emitting storage device, and electrically connecting at least one light-emitting unit to the processor. Wherein, when the host transmits a control signal to the storage device controller through the host controller interface, and the control signal is judged as a signal for controlling the at least one light-emitting unit by the storage device controller, the storage device controller further transmits the control signal to the processor to control a light-emitting mode of the at least one light-emitting unit.

In accordance with another purpose of the present disclosure, a light-emitting control method is provided, which is applicable to a light-emitting storage device. The light-emitting storage device includes a storage device controller, a processor, and at least one light-emitting unit. The light-emitting control method includes: electrically connecting the storage device controller and the processor to a host through a host controller interface in such a way that the storage device controller controls the light-emitting storage device for read/write access by the host; and disposing the at least one light-emitting unit on the light-emitting storage device, and electrically connecting the at least one light-emitting unit to the processor. Wherein, when the host transmits a control signal to the storage device controller and the processor through the host controller interface, and the control signal is judged as a signal for controlling the at least one light-emitting unit by the processor, the processor controls a light-emitting mode of the at least one light-emitting unit according to the control signal.

Preferably, the processor may have a processor firmware. A light-emitting command format is defined in the processor firmware. The light-emitting command format has a control parameter to control the light-emitting mode of the at least one light-emitting unit.

Preferably, the storage device controller may have a controller firmware. A control command format is defined in the controller firmware. The control command format includes at least a part of the control parameter of the light-emitting command format.

Preferably, the control parameter may correspondingly control a light-emitting color, a light-emitting pattern, a light-emitting brightness, a light-emitting frequency, and a light-emitting waveform of the at least one light-emitting unit.

The light-emitting storage device and the light-emitting control method mentioned above achieve controlling light emission of the light-emitting storage device through the host controller interfaces inherently built in a computer (host). In comparison with the prior art, there is no need to configure additional elements and control interfaces (bus bars) for controlling the light-emitting mode of the light-emitting storage device.

DETAILED DESCRIPTION OF THE ILLUSTRATED EMBODIMENTS

Figure 1:
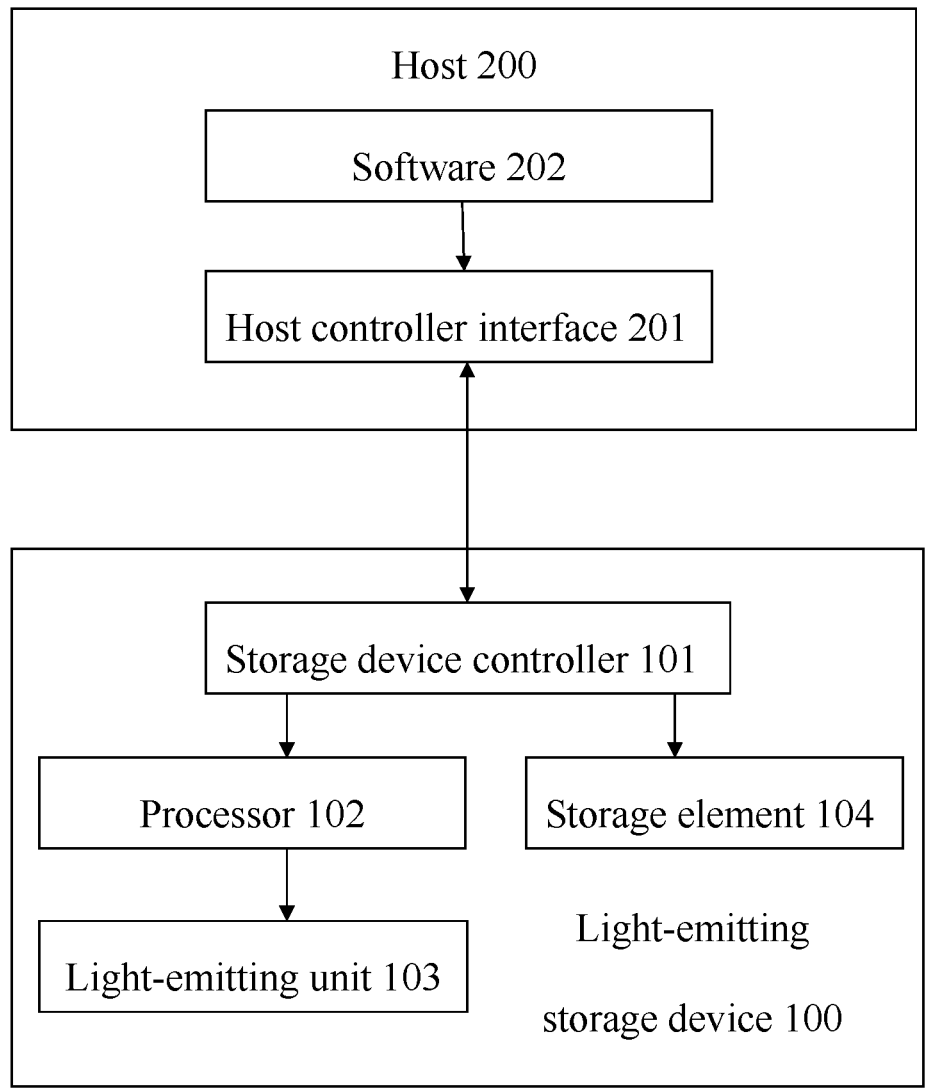
FIG. 1 depicts a block diagram of the light-emitting storage device according to the first embodiment of the present disclosure.

To facilitate the review of the technique features, contents, advantages, and achievable effects of the present disclosure, the embodiments together with the attached drawings are described below in detail. However, the drawings are used for the purpose of indicating and supporting the specification, which may not depict the real proportion of elements and precise configuration in the implementation of the present disclosure. Therefore, the depicted proportion and configuration of the attached drawings should not be interpreted to limit the scope of implementation of the present disclosure.

In accordance with one purpose of the present disclosure, a light-emitting storage device is provided. Please refer to FIG. 1, which illustrates the block diagram of the light-emitting storage device according to the first embodiment of the present disclosure. The light-emitting storage device 100 includes the storage device controller 101, the processor 102, the light-emitting unit 103, and the storage element 104, wherein the storage element 104 is disposed to store data transmitted to the light-emitting storage device 100 and the storage device controller 101 is connected to the host 200 through the host controller interface 201 to access the data. Specifically, the data from the host 200 is transmitted to the storage device controller 101 through the host controller interface 201. The storage device controller 101 then transmits the data to the storage element 104 for storage. Likewise, the storage device controller 101 is also able to read the data stored in the storage element 104 and transmit the data to the host 200 to achieve various applications. In order not to obscure the purpose of the present invention, redundant description of the storage element 104 is omitted.

According to the first embodiment, the storage device controller 101 is further electrically connected to the processor 102, and the processor 102 is electrically connected to the light-emitting unit 103, wherein the light-emitting storage device 100 may be, for example, solid-state drives and the likes. The light-emitting unit 103 may include at least one of red LEDs, green LEDs, and blue LEDs, or a combination of red LEDs, green LEDs, and blue LEDs. In addition, the processor 102 is able to be electrically connected to a light-emitting unit 103 or a plurality of light-emitting units 103, wherein each light-emitting unit 103 may include LEDs of different colors or of a single color.

Please refer to FIG. 1. The software 202 in the host 200 may allow users to set the light-emitting mode of the light-emitting unit 103. The setting of the light-emitting mode is transmitted as a control signal to the storage device controller 101 through the host controller interface 201. A processor firmware (not shown) is disposed in the storage device controller 101. A control command format (see Tables 1, 3, and 4) is defined in the controller firmware. A processor firmware (not shown) is disposed in the processor 102. A light-emitting command format (see Tables 2, 3, and 4) is defined in the processor firmware. The light-emitting storage device 100 selects the control parameters defined in Tables 1-4 to decide the light-emitting mode of the light-emitting unit 103 according to the control signal.

TABLE 1

| Header | Storage device ID | Vendor specific command | Control parameter 1 | Control parameter 2 | End instruction |
| --- | --- | --- | --- | --- | --- |
| H | AA | Vendor specific command | Table 3 | Table 4 | E |

TABLE 2

| Start instruction | Processor position | User-defined command | Control parameter 1 | Control parameter 2 | End instruction |
| --- | --- | --- | --- | --- | --- |
| S | AA | XX | Table 3 | Table 4 | E |

TABLE 3

| Control parameter 1 | Light-emitting mode |
| --- | --- |
| 0001 | Red |
| 0002 | Green |
| 0003 | Blue |
| 0004 | Default patterns |

TABLE 4

| Control parameter 2 | Light-emitting mode |
| --- | --- |
| 0001 | LED shift effect |
| 0002 | Rainbow effect |

TABLE 4-continued

| Control parameter 2 | Light-emitting mode |
|---|---|
| 0003 | Flashing effect |
| 0004 | Breathing |
| 0000~00FF | Values for RGB |

Figure 2:
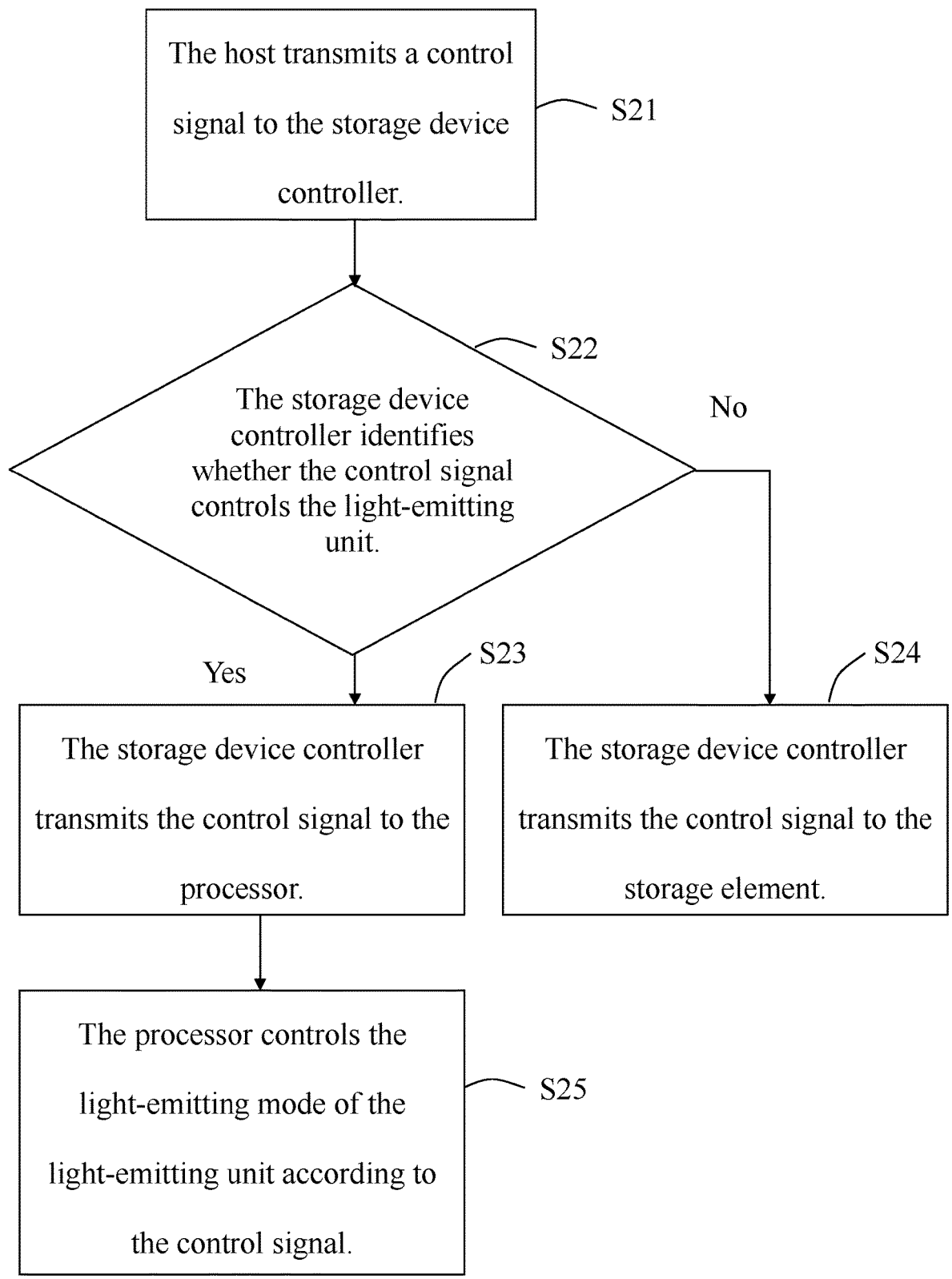
FIG. 2 depicts a flow chart of the light-emitting control method according to the first embodiment of the present disclosure.

Please refer to FIGS. 1 and 2. The software 202 transmits the control signal to the light-emitting storage device 100 and transmits the commands to the processor 102 for controlling the light-emitting mode of the light-emitting unit 103 through the host controller interface 201 inherently built in the computer. The light-emitting mode of the light-emitting unit 103 is determined according to the commands such as the control parameter 1 (see Table 3) and the control parameter 2 (see Table 4).

According to an embodiment of the present disclosure, Table 3 defines exemplary light-emitting colors and/or light-emitting patterns of the light-emitting unit 103. Table 4 defines exemplary light-emitting effects of the light-emitting unit 103. However, the present disclosure is not limited thereto. More than two types of control parameters may be defined in the control command format and the light-emitting command format. The effects corresponding to the foregoing control parameters may relate to the light-emitting brightness, light-emitting frequency, light-emitting waveform or the likes.

According to the first embodiment, it should be noticed that the storage device controller 101 not only controls the access to the storage element 104, but also controls the light-emitting mode of the light-emitting unit 103. That is, according to the present disclosure, the light-emitting mode of the light-emitting storage device may be controlled without additional control units and/or control interfaces (bus bars).

Please refer to FIG. 2, which illustrates a flow chart of the light-emitting control method according to the first embodiment of the present disclosure. When the host 200 transmits a control signal to the storage device controller 101 (Step S21), the storage device controller 101 identifies whether the control signal is the desired light-emitting mode set in the software 202 of the host 200 by the user (Step S22). If yes, the storage device controller 101 transmits the control signal to the processor 102 (Step S23), and then the processor 102 controls the light-emitting mode of the light-emitting unit 103 according to the control signal (step S25). If no and if the control signal is identified through storage device controller 101 as the signal for accessing the storage element 104, the storage device controller 101 transmits the control signal to the storage element 104 (Step S24) so as to perform the access to the storage element 104.

Figure 3:
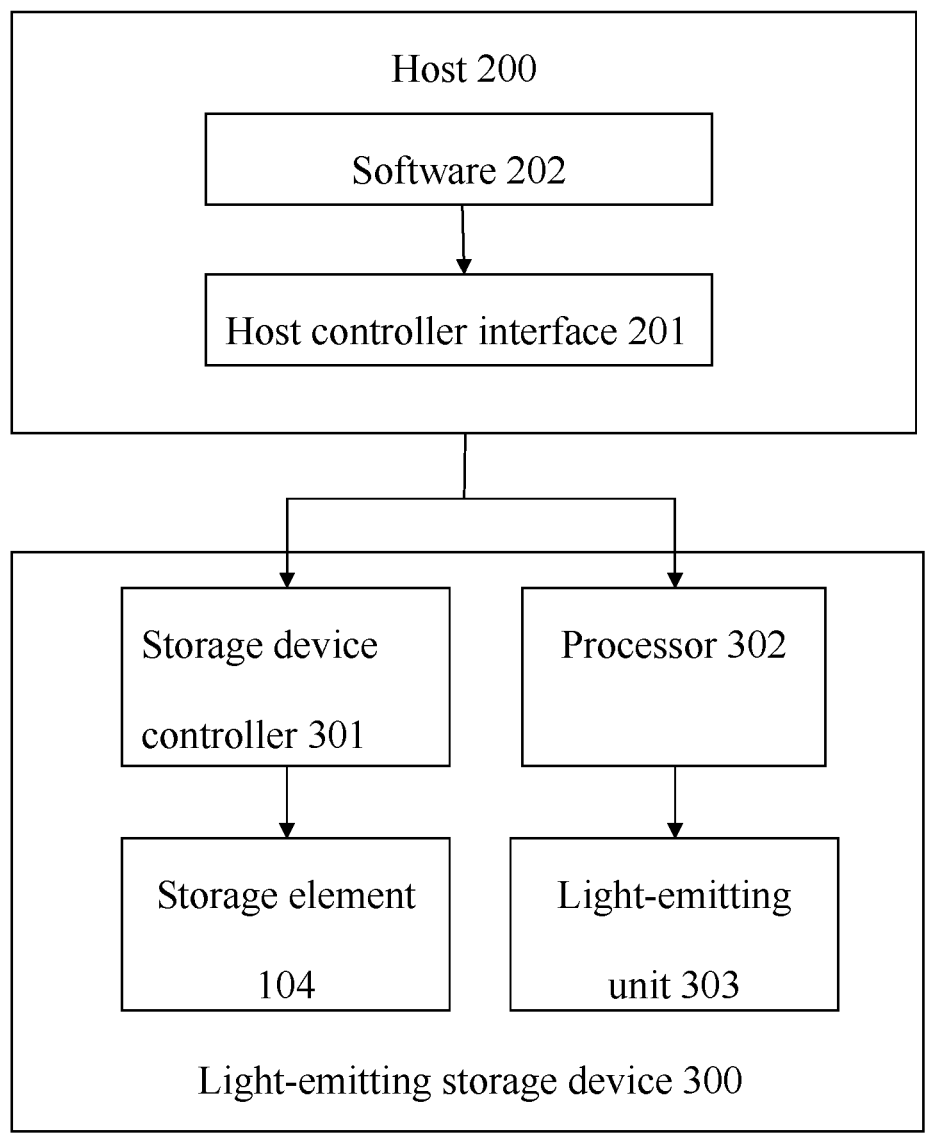
FIG. 3 depicts a block diagram of the light-emitting storage device according to the second embodiment of the present disclosure.
Figure 4:
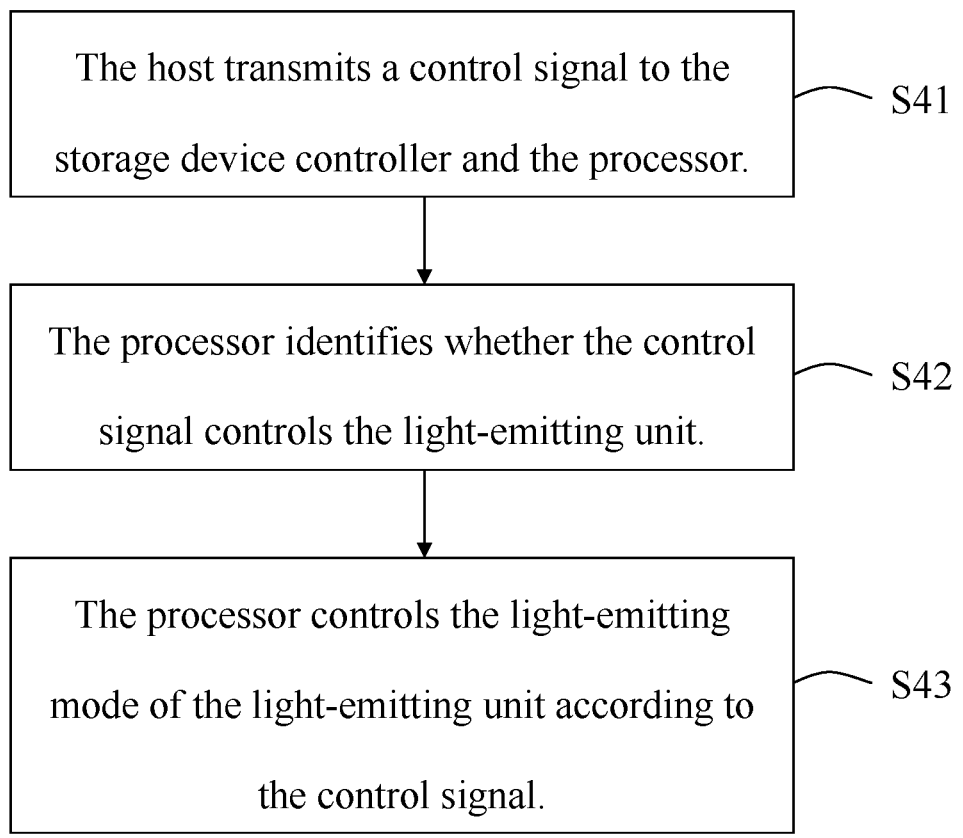
FIG. 4 depicts a flow chart of the light-emitting control method according to the second embodiment of the present disclosure.

Next, please refer to FIG. 3, which illustrates a block diagram of the light-emitting storage device according to the second embodiment of the present disclosure. The light-emitting storage device 300 includes the storage device controller 301, the processor 302, the light-emitting unit 303, and the storage element 104. In FIGS. 1 and 3, like reference numerals refer to like elements and redundant description is omitted. In the second embodiment shown in FIG. 3, the difference from FIG. 1 is that the host controller interface 201 is electrically connected to the storage device controller 301 and the processor 302 and the control signal transmitted by the host controller interface 201 is transmitted to the storage device controller 301 and the processor 302 simultaneously. Please refer to FIG. 4 together with FIG. 3, wherein FIG. 4 illustrates a flow chart of the light-emitting control method according to the second embodiment of the present disclosure. When the host 200 transmits a control signal to the storage device controller 301 and the processor 302 (Step S41), the processor 302 identifies whether the control signal is the desired light-emitting mode set in the software 202 of the host 200 by the user (Step 42). If yes, the processor 302 controls the light-emitting mode of the light-emitting unit 303 according to the control signal (Step 43). Alternatively, if the control signal is not used to control the light-emitting mode of the light-emitting unit 303 and is identified by the storage device controller 301 as a signal for accessing the storage element 104, the storage device controller 301 then transmits the control signal to the storage element 104 so as to access the storage element 104 (not shown).

A controller firmware is likewise disposed in the storage device controller 301 and a control command format is defined therein (see Tables 1, 3, and 4). A processor firmware is also disposed in the processor 302 and a light-emitting command format is defined therein (see Tables 2, 3, and 4). The light-emitting storage device 300 may also select the control parameters defined in Table 3 and Table 4 according to the control signal to determine the light-emitting mode of the light-emitting unit 303.

In the second embodiment, it should be noticed that the storage device controller 301 and the processor 302 respectively control the access to the storage element 104 and the light-emitting mode of the light-emitting unit 303 without additional control interfaces (bus bars).

The control of light-emitting storage device 100 and the light-emitting storage device 300 for light emission thereon is achieved through the host controller interface 201 inherently built in the computer (the host 200). In comparison with the prior art, no additional elements and control interfaces (bus bars) are needed, resulting in reduction of additional costs.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, loops, circuits, and/or modules, these elements, components, loops, circuits, and/or modules should not be limited by these terms. These terms may be only used to distinguish one element, component, loop, circuit or module from another element, component, loop, circuit or module. Terms such as "first," "second," and other numerical terms when used herein do not imply a sequence or order unless clearly indicated by the context. Thus, a first element, component, loop, circuit or module discussed below could be termed a second element, component, loop, circuit or module without departing from the teachings of the example implementations disclosed herein.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The above description is merely illustrative rather than restrictive. Any equivalent modification or alteration without departing from the spirit and scope of the present invention should be included in the appended claims.

What is claimed is:

1. A light-emitting storage device to be installed inside a host, comprising:
   a storage element;
   a storage device controller, electrically connected to the host through a host controller interface built in the host, and the storage device controller further configured to electrically connect to the storage element and to perform reading and writing according to a control signal from the host;

a processor, electrically and directly connected to the storage device controller and subsequently connected to the host through the storage device controller; and at least one light-emitting unit, electrically connected to the processor and configured to be controlled by the processor;

wherein, when the host transmits the control signal to the storage device controller through the host controller interface, and the control signal is identified, by the storage device controller, as a signal for controlling the at least one light-emitting unit or a signal for accessing the storage element, and when the control signal is identified as the signal for controlling the at least one light-emitting unit, the storage device controller further transmits the control signal to the processor to control a light-emitting mode of the at least one light-emitting unit, when the control signal is identified as the signal for accessing the storage element, the storage device controller accesses the storage element accordingly without transmitting the control signal to the processor.

2. The light-emitting storage device of claim 1, wherein the processor has a processor firmware, a light-emitting command format is defined in the processor firmware, and the light-emitting command format has a control parameter to control the light-emitting mode of the at least one light-emitting unit.

3. The light-emitting storage device of claim 2, wherein the storage device controller has a controller firmware, a control command format is defined in the controller firmware, and the control command format comprises at least a portion of the control parameter of the light-emitting command format.

4. The light-emitting storage device of claim 3, wherein the control parameter correspondingly controls a light-emitting color, a light-emitting pattern, a light-emitting brightness, a light-emitting frequency, and a light-emitting waveform of the at least one light-emitting unit.

5. A light-emitting storage device to be installed inside a host, comprising:
a storage element;
a storage device controller, electrically connected to the host through a host controller interface built in the host, and the storage device controller controlling the light-emitting storage device to perform reading and writing according to a control signal from the host;
a processor, electrically and directly connected to the host through the host controller interface; and
at least one light-emitting unit, electrically connected to the processor and configured to be controlled by the processor;
wherein, the host transmits the control signal to the storage device controller and the processor through the host controller interface, and when the control signal is identified, by the processor, as a signal for controlling the at least one light-emitting unit, the processor controls a light-emitting mode of the at least one light-emitting unit according to the control signal, when the control signal is identified, by the storage device controller, as a signal for accessing the storage element, the storage device controller accesses the storage element accordingly.

6. The light-emitting storage device of claim 5, wherein the processor has a processor firmware, a light-emitting command format is defined in the processor firmware, and the light-emitting command format has a control parameter to control the light-emitting mode of the at least one light-emitting unit.

7. The light-emitting storage device of claim 6, wherein the storage device controller has a controller firmware, a control command format is defined in the controller firmware, and the control command format comprises at least a portion of the control parameter of the light-emitting command format.

8. The light-emitting storage device of claim 7, wherein the control parameter correspondingly controls a light-emitting color, a light-emitting pattern, a light-emitting brightness, a light-emitting frequency, and a light-emitting waveform of the at least one light-emitting unit.

9. A light-emitting control method for a light-emitting storage device installed inside a host, the light-emitting storage device comprising a storage element, a storage device controller, a processor, and at least one light-emitting unit, and the light-emitting control method comprising:
electrically connecting the storage device controller to the host through a host controller interface built in the host in such a way that the storage device controller controls the light-emitting storage device for read/write access to the storage element by the host according to a control signal from the host;
electrically and directly connecting the processor to the storage device controller and subsequently connected to the host through the storage device controller; and
electrically connecting the at least one light-emitting unit to the processor to be controlled thereby;
wherein, when the host transmits the control signal to the storage device controller through the host controller interface, and the control signal is identified, by the storage device controller, as a signal for controlling the at least one light-emitting unit or a signal for accessing the storage element, and when the control signal is identified as the signal for controlling the at least one light-emitting unit, the storage device controller further transmits the control signal to the processor to control a light-emitting mode of the at least one light-emitting unit, when the control signal is identified as the signal for accessing the storage element, the storage device controller accesses the storage element accordingly without transmitting the control signal to the processor.

10. The light-emitting control method of claim 9, wherein the processor has a processor firmware, a light-emitting command format is defined in the processor firmware, and the light-emitting command format has a control parameter to control the light-emitting mode of the at least one light-emitting unit.

11. The light-emitting control method of claim 10, wherein the storage device controller has a controller firmware, a control command format is defined in the controller firmware, and the control command format comprises at least a portion of the control parameter of the light-emitting command format.

12. The light-emitting control method of claim 11, wherein the control parameter correspondingly controls a light-emitting color, a light-emitting pattern, a light-emitting brightness, a light-emitting frequency, and a light-emitting waveform of the at least one light-emitting unit.

13. A light-emitting control method for a light-emitting storage device installed inside a host, the light-emitting storage device comprising a storage element, a storage device controller, a processor, and at least one light-emitting unit, and the light-emitting control method comprising:
electrically connecting the storage device controller and the processor to the host through a host controller interface built in the host in such a way that the storage device controller controls the light-emitting storage device for read/write access to the storage element by the host according to a control signal from the host electrically and directly connecting the processor to the host through the storage device controller; and electrically connecting the at least one light-emitting unit to the processor to be controlled thereby;

wherein, the host transmits the control signal to the storage device controller and the processor through the host controller interface, and when the control signal is identified, by the processor, as a signal for controlling the at least one light-emitting unit, the processor controls a light-emitting mode of the at least one light-emitting unit according to the control signal, when the control signal is identified, by the storage device controller, as a signal for accessing the storage element, the storage device controller accesses the storage element accordingly.

14. The light-emitting control method of claim 13, wherein the processor has a processor firmware, a light-emitting command format is defined in the processor firmware, and the light-emitting command format has a control parameter to control the light-emitting mode of the at least one light-emitting unit.

15. The light-emitting control method of claim 14, wherein the storage device controller has a controller firmware, a control command format is defined in the controller firmware, and the control command format comprises at least a portion of the control parameter of the light-emitting command format.

16. The light-emitting control method of claim 15, wherein the control parameter correspondingly controls a light-emitting color, a light-emitting pattern, a light-emitting brightness, a light-emitting frequency, and a light-emitting waveform of the at least one light-emitting unit.

* * * * *